United States Patent
Chun et al.

(10) Patent No.: US 9,846,543 B2
(45) Date of Patent: Dec. 19, 2017

(54) STORAGE DEVICE INCLUDING MEMORY CONTROLLER AND MEMORY SYSTEM INCLUDING THE SAME

(71) Applicant: SK hynix Inc., Gyeonggi-do (KR)

(72) Inventors: Dong Yeob Chun, Seoul (KR); Dong Jae Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 63 days.

(21) Appl. No.: 14/877,631

(22) Filed: Oct. 7, 2015

(65) Prior Publication Data

US 2016/0313928 A1    Oct. 27, 2016

(30) Foreign Application Priority Data

Apr. 27, 2015    (KR) ................. 10-2015-0058972

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,145,831 B2* | 3/2012 | Oshima | ........... | G06F 3/0626 365/201 |
| 8,990,458 B2* | 3/2015 | Yano | ........... | G06F 12/0246 710/18 |
| 2013/0067138 A1* | 3/2013 | Schuette | ........... | G06F 3/0616 711/103 |
| 2013/0166934 A1* | 6/2013 | Chu | ........... | G06F 1/3275 713/323 |
| 2014/0244903 A1* | 8/2014 | Yano | ........... | G06F 12/0246 711/103 |
| 2015/0213896 A1* | 7/2015 | Lieber | ........... | G06F 3/061 711/103 |
| 2016/0041760 A1* | 2/2016 | Kuang | ........... | G11C 11/5628 711/103 |
| 2016/0203075 A1* | 7/2016 | Shin | ........... | G11C 7/1039 711/103 |

FOREIGN PATENT DOCUMENTS

KR    100791006    12/2007

\* cited by examiner

*Primary Examiner* — Kevin Verbrugge
(74) *Attorney, Agent, or Firm* — IP & T Group LLP

(57) ABSTRACT

Disclosed is a storage device, including: a memory controller configured to generate mode maintenance information or mode change information in response to a command received from a host; and a memory device configured to perform a selected operation in a previous mode when the mode maintenance information is received, and change a mode and perform the selected operation when the mode change information is received.

21 Claims, 4 Drawing Sheets

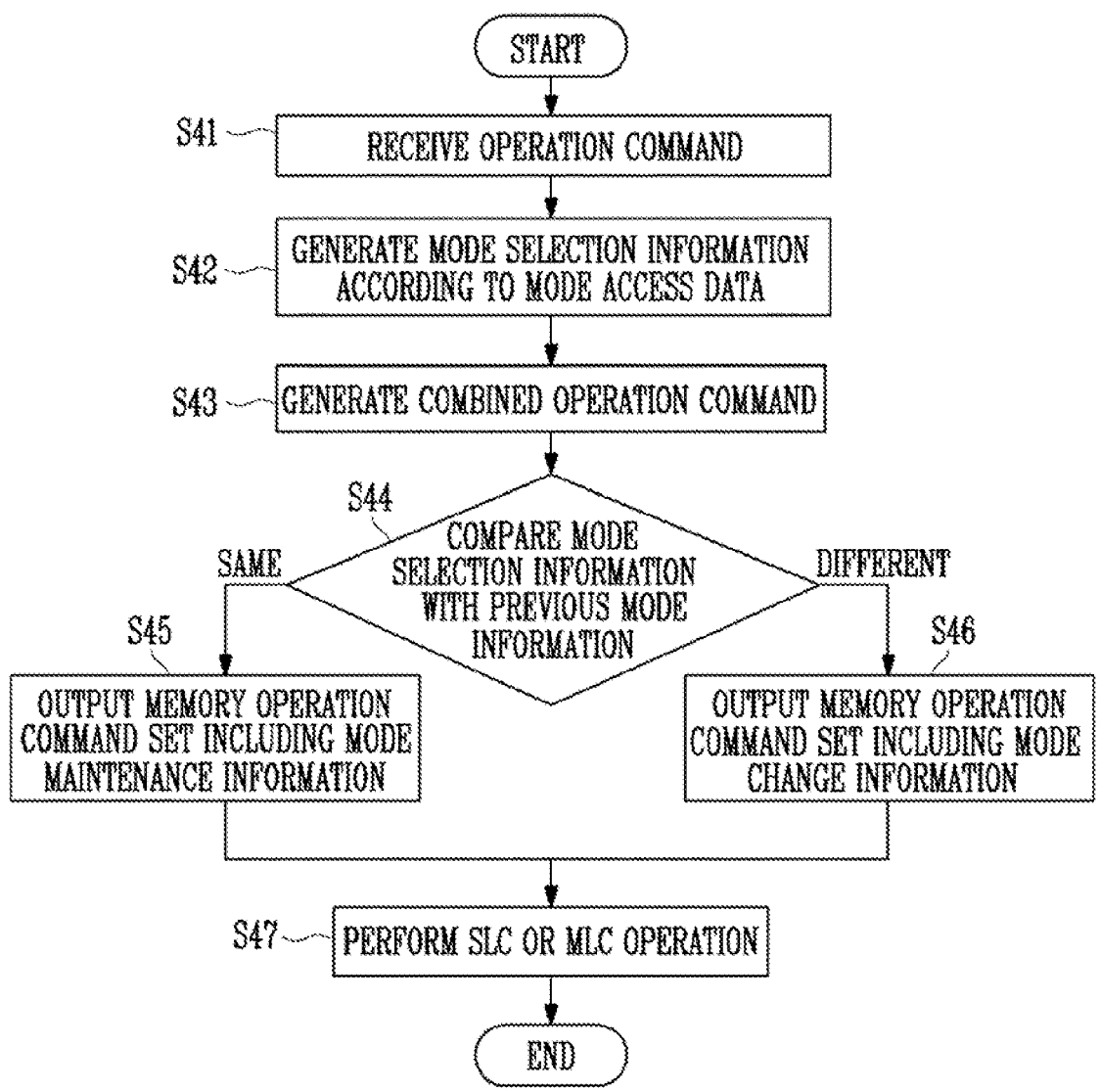

STORAGE DEVICE INCLUDING MEMORY CONTROLLER AND MEMORY SYSTEM INCLUDING THE SAME

CROSS-REFERENCE TO RELATED APPLICATION

The present application claims priority to Korean patent application number 10-2015-0058972 filed on Apr. 27, 2015, in the Korean Intellectual Property Office, the entire disclosure of which is incorporated by reference.

BACKGROUND

1. Field

Various embodiments of the present application relate to a storage device, a memory system including the same, and more particularly, to a storage device including a memory controller.

2. Discussion of Related Art

Memory systems generally include a host and a storage device.

A storage device operates in response to various commands received from the host. For example, a storage device includes a memory device for storing data and a memory controller for operating the memory device in response to various commands received from a host.

A memory controller continuously performs complex operations for converting commands to perform a program/erase/read operation on a memory device, based on various commands and data received from a host. Accordingly, to maintain reliability of the memory device, reliability of the memory controller driving the memory device needs to be secured.

However, when driving hours of the memory controller increases, performance and life of the memory controller may deteriorate, thereby deteriorating reliability of the storage device. Accordingly, it is necessary to simplify the operations of the memory controller.

SUMMARY

Various embodiments of the present invention are directed to a storage device having a memory controller with simplified operations, and a memory system including the same.

An embodiment of the present application provides a storage device, including: a memory controller configured to generate a mode maintenance signal or a mode change signal in response to a command received from a host; and a memory device configured to perform a selected operation in a previous mode when the mode maintenance signal is received, and change a mode and perform the selected operation when the mode change signal is received.

An embodiment of the present application provides a memory system, including; a host configured to output a command; and a storage device configured to generate a mode maintenance signal or a mode change signal according to the command, and perform a selected operation in a previous mode in response to the mode maintenance signal or perform the selected operation by changing a mode in response to the mode change signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present application will become more apparent to those of ordinary skill in the art by describing in detail embodiments thereof with reference to the attached drawings in which:

FIG. 6 is a flowchart for describing an operation of the storage device 1200 shown in FIG. 1.

DETAILED DESCRIPTION

Hereinafter, exemplary embodiments of the present application will be described in detail with reference to the accompanying drawings. However, the invention disclosed is not limited to the embodiments disclosed below, and may implemented in various ways.

The drawings are not necessarily to scale and, in some instances, proportions may have been exaggerated to clearly illustrate features of the embodiments. It is also noted that in this specification, "connected/coupled" refers to one component not only directly coupling another component, but also indirectly coupling another component through an intermediate component. In addition, a singular form may include a plural form as long as it is not specifically mentioned.

Figure 1:
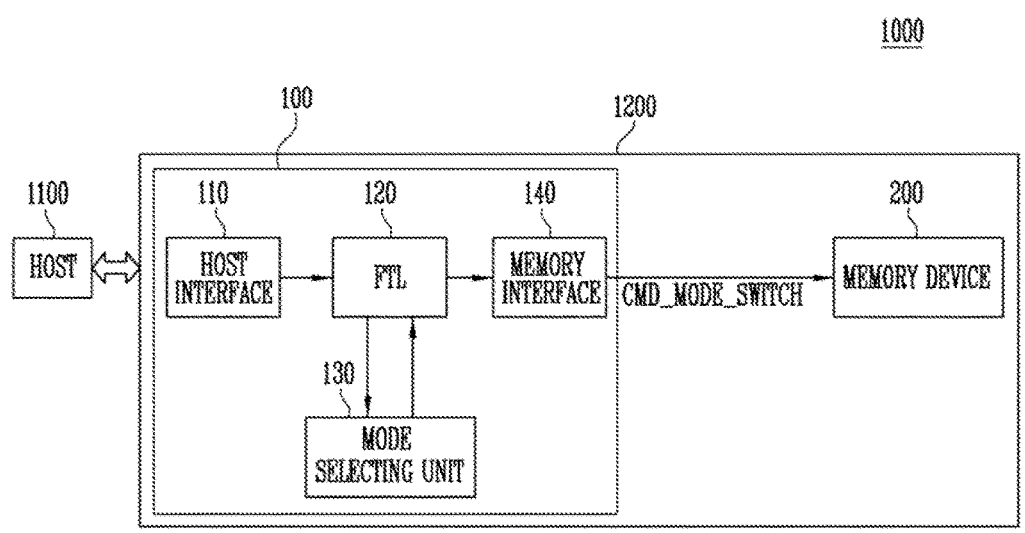
FIG. 1 is a block diagram illustrating a memory system according to an embodiment of the present application.

FIG. 1 is a block diagram illustrating a memory system 1000 according to an embodiment of the present application.

Referring to FIG. 1, the memory system 1000 may include a host 1100 and a storage device 1200.

The host 1100 may communicate with the storage device 1200 by using an interface protocol, such as Peripheral Component Interconnect-Express (PCI-E), Advanced Technology Attachment (ATA), Serial ATA (SATA), Parallel ATA (PATA), or serial attached SCSI (SAS). Further, the interface protocol between the host 1100 and the storage device 1200 is not limited to the aforementioned examples, and may include another interface protocols, such as a Universal Serial Bus (USB), a Multi-Media Card (MMC), an Enhanced Small Disk Interface (ESDI), or Integrated Drive Electronics (IDE).

The storage device 1200 may include a memory controller 100 and a memory device 200.

The memory controller 100 controls general operation of the memory device 200 according to a request of the host 1100, and controls data exchange between the host 1100 and the memory device 200. The memory controller 100 may include a host interface 110, a flash translation layer (FTL) 120, a mode selecting unit 130, and a memory interface 140.

The host interface 110 receives a command from the host 1100, and generates an operation command to transmit the operation command to the FTL 120.

The FTL 120 generates mode access data for selecting a mode in response to the operation command, and transmits the mode access data to the mode selecting unit 130. Further, the FTL 120 receives mode selection information from the mode selecting unit 130, and outputs the mode selection information and the operation command to transmit to the interface 140.

When the mode selecting unit 130 receives the mode access data, it generates the mode selection information to transmit the mode selection information to the FTL 120. For example, the mode selecting unit 130 may generate Single Level Cell (SLC) mode selection information or Multi-Level Cell (MLC) mode selection information according to the mode access data.

The memory interface 140 generates a memory operation command set CMD_MODE_SWICH for operating the memory device 200 according to the operation command, a mode maintenance signal for maintaining a previous operation mode of the memory device 200, or a mode changing signal for changing the operation mode of the memory device 200, and transmits the memory operation command set, mode maintenance signal, or mode changing signal to the memory device 200. That is, the memory controller 100 may output a mode output command to the memory device 200 to determine a mode (a mode of a previously performed operation) of the memory device 200, and receive information about a previous mode from the memory device 200, and omit an operation of determining the kind of previous mode of the memory device 200 according to the received information. As described above, the memory controller 100 may omit the operation of determining of a mode of the memory device 200, so that it is possible to decrease operation time, and extend life of the memory controller 100 by decreasing the operation time.

When the mode maintenance signal is received, the memory device 200 maintains a previously set operation mode and performs a corresponding operation according to the memory operation command set. Otherwise, when the mode change signal is received, the memory device 200 sets a previously set operation mode to another operation mode and performs a corresponding operation according to the memory operation command set. The semiconductor device 200 may be implemented by a Double Data Rate Synchronous Dynamic Random Access Memory (DDR SDRAM), Low Power Double Data Rate4 (LPDDR4) an SDRAM, a Graphics Double Data Rate (GDDR) SDRAM, a Low Power DDR (LPDDR), a Rambus Dynamic Random Access Memory (RDRAM), or a flash memory according to an embodiment.

Figure 2:
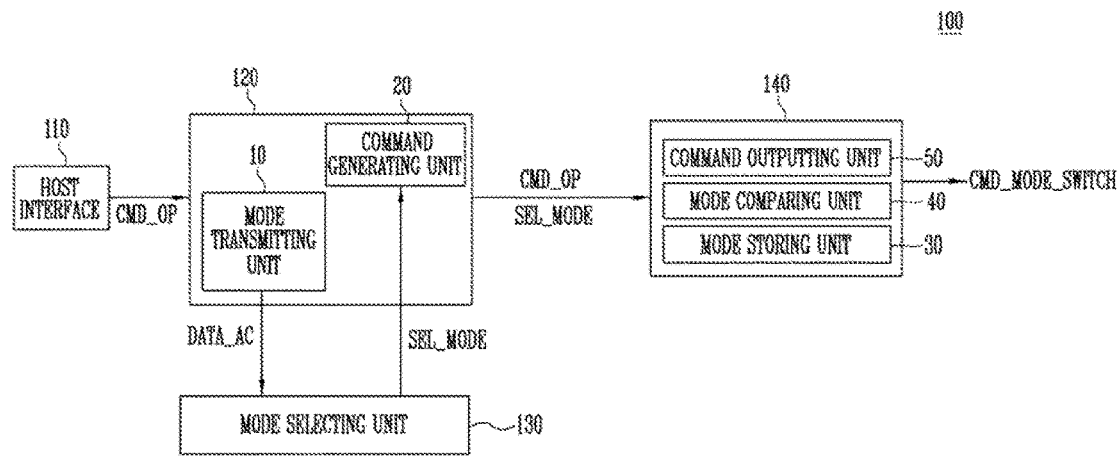
FIG. 2 is a detailed diagram of a memory controller shown in FIG. 1.

FIG. 2 is a detailed diagram of the memory controller 100 shown in FIG. 1.

Referring to FIG. 2, the memory controller 100 may include the host interface 110, the FTL 120, the mode selecting unit 130, and the memory interface 140.

The host interface 110 receives a command from the host 1100 (see FIG. 1), and generates an operation command CMD_OP and transmits the operation command CMD_OP to the FTL 120.

The FTL 120 may include a mode transmitting unit 10 and a command generating unit 20.

The mode transmitting unit 10 generates mode access data DATA_AC and transmits the mode access data DATA_AC to the mode selecting unit 130. The mode selecting unit 130 selects an SLC mode or an MLC mode based on the mode access data DATA_AC, and generates a mode selection information SEL_MODE corresponding to the selected mode. The command generating unit 20 outputs the operation command CMD_OP and the mode selection information SEL_MODE to the memory interface 140.

When the mode access data DATA_AC is received, the mode selecting unit 130 based on the mode access data DATA_AC determines an operation mode to be performed and outputs the mode selection information SEL_MODE. The mode selection information SEL_MODE may correspond to the SLC mode or the MLC mode.

Accordingly, the mode selection information SEL_MODE outputted from the FTL 120 may include an SLC mode information or an MLC mode information.

The memory interface 140 receives the operation command CMD_OP and the mode selection information SEL_MODE which includes the SLC mode information or the MLC mode information from the FTL 120, and outputs the memory operation command set CMD_MODE_S-WICH. The memory operation command set CMD_MOD-E_SWICH is a memory operation command including a mode information. That is, the memory operation command set CMD_MODE_SWICH may be a set of the memory operation command CMD and a mode maintenance information or a set of the memory operation command CMD and a mode change information. The memory interface 140 may include a mode storing unit 30 a mode comparing unit 40, and a command outputting unit 50.

Previous mode information of the memory device 200 is stored in the mode storing unit 30. The previous mode information stored in the mode storing unit 30 is updated whenever an operation of the memory device 200 ends.

The mode comparing unit 40 compares the mode selection information SEL_MODE with the previous mode information stored in the mode storing unit 30, and outputs the mode information. That is, the mode information may correspond to a mode maintenance information or a mode change information according to a result of the comparison. For example, when the mode selection information SEL_MODE is the same as the previous mode information, the mode comparing unit 40 outputs the mode maintenance information, and when the mode selection information SEL_MODE is different from the previous mode information, the mode comparing unit 40 outputs the mode change information.

The command outputting unit 50 outputs the memory operation command set CMD_MODE_SWITCHING to the memory device 200 (see FIG. 1) based on the mode maintenance information or the mode change information.

For example, when the previous mode of the memory device 200 is the SLC mode and an operation to be currently performed is in the SLC mode, the mode comparing unit 40 outputs the mode maintenance information, so that the command output unit 50 outputs the memory operation command set CMD_MODE_SWITCH including the mode maintenance information. When the previous mode of the memory device 200 is the SLC mode and an operation to be currently performed is in the MLC mode, the mode comparing unit 40 outputs the mode change information, so that the command output unit 50 outputs the memory operation command set CMD_MODE_SWITCH including the mode change information. When the previous mode of the memory device 200 is the MLC mode and an operation to be currently performed is in the SLC mode, the mode comparing unit 40 outputs the mode change information, so that the command output unit 50 outputs the memory operation command set CMD_MODE_SWITCH including the mode change information. When the previous mode of the memory device 200 is the MLC mode and an operation to be currently performed is in the MLC mode, the mode comparing unit 40 outputs the mode maintenance information, so that the command output unit 50 outputs the memory operation command set CMD_MODE_SWITCH including the mode maintenance information.

The memory device 200 performs an operation corresponding to the operation command CMD_OP in the SLC mode or MLC mode. Further, the memory controller 100 may generate an address used for the operation in the SLC or MLC mode, in addition to the memory operation command set CMD_MODE_SWITCH, and transmit the address and the data received from the host 1100 (see FIG. 1) to the memory device 200.

Figure 3:
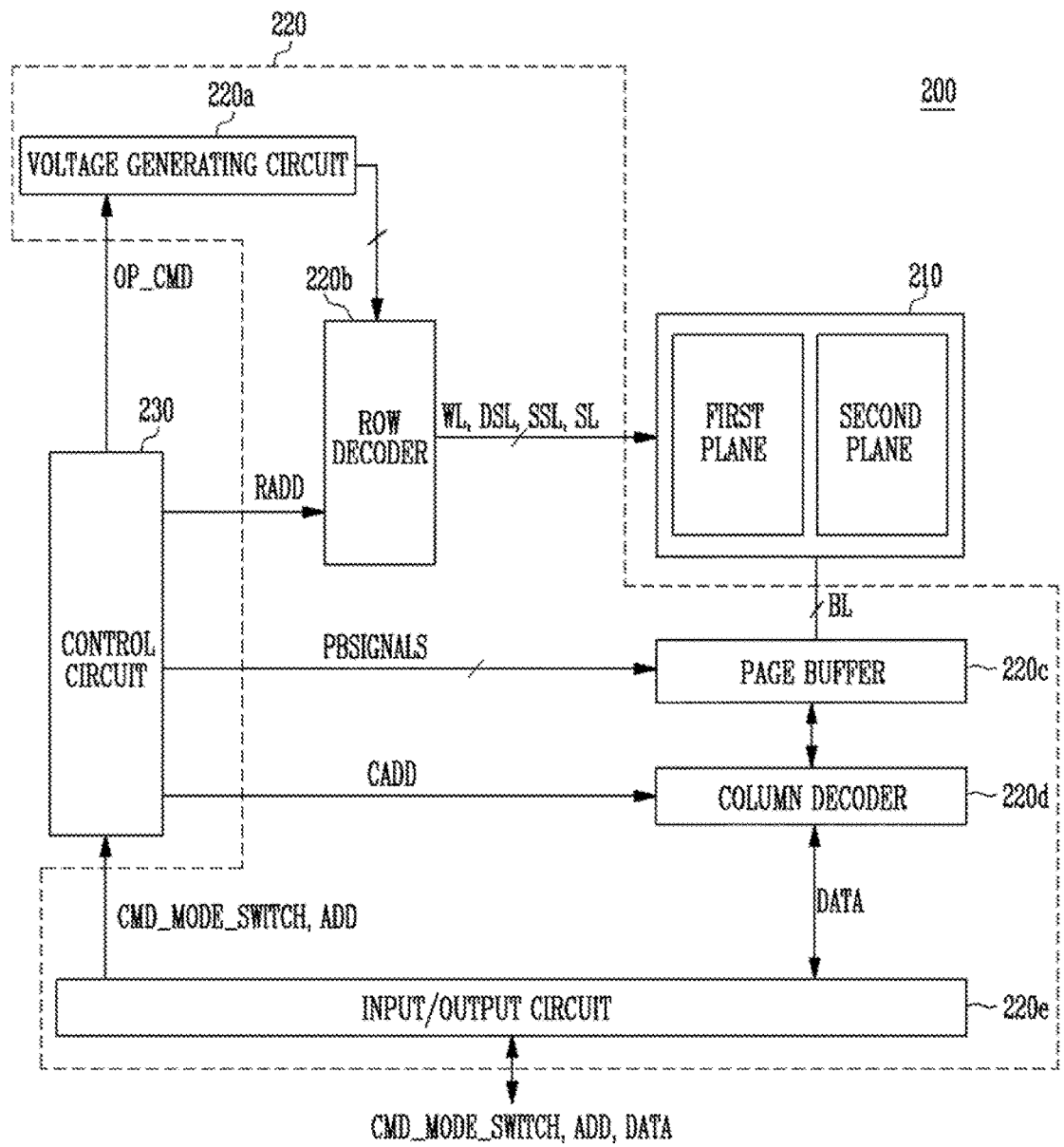
FIG. 3 is a detailed diagram of a memory device shown in FIG. 1.

FIG. 3 is a detailed diagram of the memory device 200 shown in FIG. 1.

Referring to FIG. 3, the memory device 200 may include a memory cell array 210 in which data is stored, a peripheral circuit 220 performing a program, read, or erase operation, and a control circuit 230 controlling the peripheral circuit 220.

The memory cell array 210 may include a plurality of planes. For example, the memory cell array 210 may include a first plane and a second plane. Each plane may include a plurality of memory blocks, and each of the memory blocks may include a plurality of memory cells.

The peripheral circuit 220 may include a voltage generating circuit 220*a*, a row decoder 220*b*, a page buffer 220*c*, a column decoder 220*d*, and an input/output circuit 220*e*.

The voltage generating circuit 220*a* generates voltages used for a program operation, a read operation, or an erase operation in response to an operation signal OP_CMD received from the control circuit 230.

The row decoder 220*b* may transmit the voltages to word lines, drain select lines DSL, source select lines SSL, and source lines SL connected to a selected memory block included in a selected plane in response to a row address RADD received from the control circuit 230.

The page buffer 220*c* is connected to a cell array 210 through bit lines BL. The page buffer 220*c* may exchange data with the selected memory block of the selected plane through the bit lines BL in response to a page buffer control signal PBSIGNALS, and temporally store the data.

The column decoder 220*d* may transmit data DATA received from the input/output circuit 220*e* to the page buffer 220*c* in response to a column address CADD received from the control circuit 230, and transmit the data received from the page buffer 220*c* to the input output circuit 220*e*.

The input/output circuit 220*e* receives the memory operation command set CMD_MODE_SWITCH from the memory controller 100 (see FIG. 1), and transmits the memory operation command set CMD_MODE_SWITCH to the control circuit 230. Further, the input/output circuit 220*e* may receive the address ADD and the data DATA from outside (e.g., the memory controller 100), transmit the address ADD to the control circuit 230, and transmit the data DATA to the column decoder 220*d*. Further, the input/output circuit 220*e* may output the data DATA received from the column decoder 220*d* to outside (e.g., the memory controller 100).

When the memory operation command set CMD_MODE_SWITCH including the mode maintenance information is received, the control circuit 230 maintains a previously performed operation mode. When the memory operation command set CMD_MODE_SWITCH including the mode change information is received, the control circuit 230 changes the operation mode. Particularly, the control circuit 230 may store a parameter corresponding to the SLC mode or a parameter corresponding to the MLC mode according to the operation mode. When the control circuit 230 is set for the SLC mode, the control circuit 230 may be set to perform an algorithm of the SLC mode by using the parameter of the SLC mode, and control the peripheral circuit 220 according to a set value. When the control circuit 230 is set for the MLC mode, the control circuit 230 may be set to perform an algorithm of the MLC mode by using the parameters of the MLC mode, and control the peripheral circuit 220 according to a set value. For example, when the memory operation command set CMD_MODE_SWITCH including the mode maintenance information for a program operation are received, the control circuit 230 may control the peripheral circuit 220 so that the program operation is performed in the previous mode.

Figure 4:
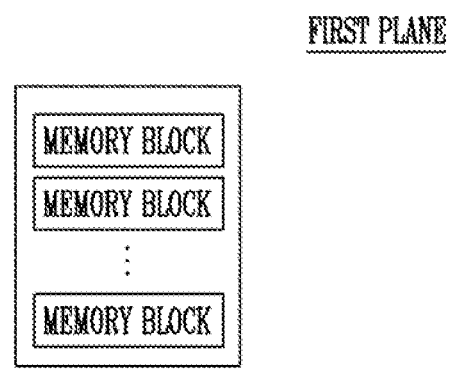
FIG. 4 is a detailed diagram of a first plane shown in FIG. 3.

FIG. 4 is a detailed diagram of the first plane shown in FIG. 3.

Referring to FIG. 4, the first plane may include a plurality of memory blocks. Further, the second plane may have the same configurations as the first plane.

Figure 5:
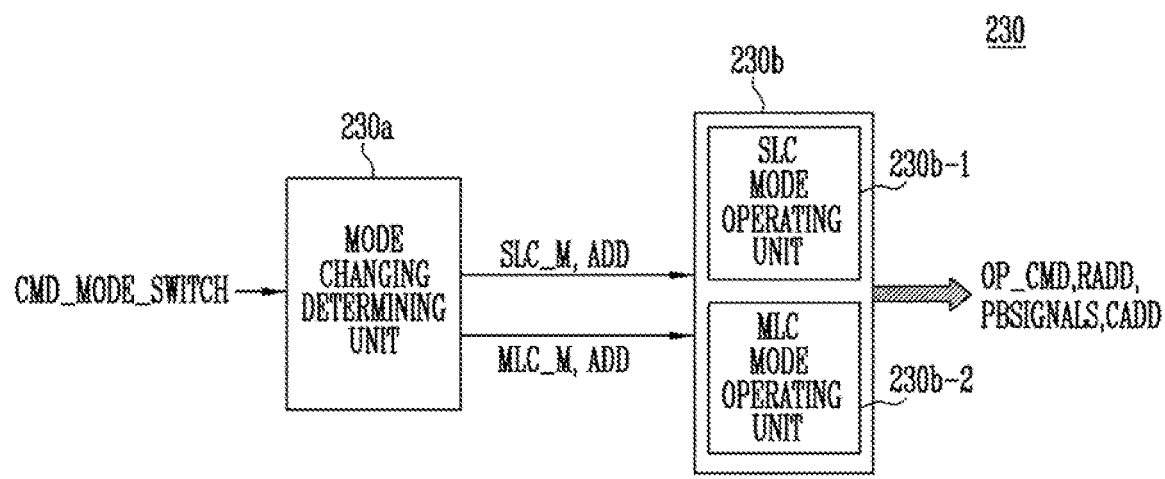
FIG. 5 is a detailed diagram of a control circuit shown in FIG. 3.

FIG. 5 is a detailed diagram of the control circuit 230 shown in FIG. 3.

Referring to FIG. 5, the control circuit 230 may include a mode change determining unit 230*a* and a mode operating mode 230*b*. The mode change determining unit 230*a* receives the memory operation command set CMD_MODE_SWITCH including the mode information and the address ADD, and determines whether to maintain the previous mode or change the operation mode.

For example, the mode change determining unit 230*a* may output signals set for the previous mode in response to the memory operation command set CMD_MODE_SWITCH including the mode maintenance information. When the previous mode is the SLC mode and the memory operation command set CMD_MODE_SWITCH including the mode maintenance information is received, the mode change determining unit 230*a* activates an SLC mode signal SLC_M. When the previous mode is the SLC mode and the memory operation command set CMD_MODE_SWITCH including the mode change information is received, the mode change determining unit 230*a* activates an MLC mode signal MLC_M. When the previous mode is the MLC mode and the memory operation command set CMD_MODE_SWITCH including the mode maintenance information is received, the mode change determining unit 230*a* activates the MLC mode signal MLC_M. When the previous mode is the MLC mode and the memory operation command set CMD_MODE_SWITCH including the mode change information is received, the mode change determining unit 230*a* activates the SLC mode signal SLC_M.

The mode operating unit 230*b* may include an SLC mode operating unit 230*b*-1 and an MLC mode operating unit 230*b*-2. When the activated SLC mode signal SLC_M and the address ADD are received, the SLC mode operating unit 230*b*-1 outputs the operation signal OP_CMD, the row address RADD, the page buffer control signal PBSIGNALS, and the column address CADD by using the parameter corresponding to the SLC mode so that an algorithm appropriate to the SLC mode is performed. When the activated MLC mode signal MLC_M and the address ADD are received, the MLC mode operating unit 230*b*-2 outputs the operation signal OP_CMD, the row address RADD, the page buffer control signal PBSIGNALS, and the column address CADD by using the parameters corresponding to the MLC mode so that an algorithm appropriate to the MLC mode is performed.

FIG. 6 is a flowchart for describing an operation of the storage device 1200 shown in FIG. 1.

Referring to FIGS. 1, 2 and 6, when a command is received from the host 100, the host interface 110 generates the operation command CMD_OP and transmits the operation command CMD_OP to the mode transmitting unit 10. The mode transmitting unit 10 transmit the mode access data DATA_AC to the mode selecting unit 130 in response to the operation command CMD_OP (S41).

The mode selecting unit 130 generates the mode selection information SEL_MODE according to the mode access data DATA_AC (S42).

The command generating unit 20 outputs the operation command CMD_OP and the mode selection information SEL_MODE to the memory interface 140 (S43).

The mode comparing unit 40 compares previous mode information with the mode selection information SEL_MODE (S44). When the previous mode information stored in the mode storing unit 30 is the same as the mode selection information SEL_MODE, the command outputting unit 50 outputs the memory operation command set CMD_MODE_SWITCH including the mode maintenance information (S45). On the other hand, when the previous mode information stored in the mode storing unit 30 is different from the mode selection information SEL_MODE, the command outputting unit 50 outputs the memory operation command set CMD_MODE_SWITCH including the mode change information (S46).

The memory device 200 performs an operation a program operation) in the SLC mode or the MLC mode according to the memory operation command set CMD_MODE_SWITCH (S47).

As described above, the memory device 200 is accessed to check a previous mode of the memory device 200, and an operation of determining a previous operation mode of the memory device 200 is omitted based on data from the memory device 200, so that it is possible to simplify the operation of the memory controller 100. When the operation of the memory controller 100 is simplified, the operation time of the memory controller 100 may be reduced, thereby improving performance and life of the memory controller.

As described above, embodiments have been disclosed in the drawings and the specification. The specific terms used herein are for illustration, and do not limit the scope of the present application as defined in the claims. Accordingly, those skilled in the art will appreciate that various modifications and other equivalents can be made without departing from the scope and spirit of the present disclosure. Therefore, the scope of the present application is defined by the claims, below.

What is claimed is:

1. A storage device, comprising:
   a memory controller suitable for generating a memory operation command set including mode maintenance information or mode change information determined according to a command received from a host; and
   a memory device suitable for performing an operation corresponding to the command in an operation mode determined according to the mode maintenance information or the mode change information, and performing a first algorithm corresponding to the mode maintenance information and a second algorithm corresponding to the mode change information.

2. The storage device of claim 1, wherein the memory controller includes:
   a host interface suitable for generating an operation command based on the command received from the host;
   a Flash Translation Layer (FTL) suitable for generating mode access data based on the operation command, and outputting the operation command and a mode selection information;
   a mode selecting unit suitable for outputting the mode selection information based on the mode access data; and
   a memory interface suitable for outputting the memory operation command set to the memory device based on the operation command and the mode selection information.

3. The storage device of claim 2, wherein the FTL includes:
   a mode transmitting unit suitable for transmitting the mode access data to the mode selecting unit in response to the operation command; and
   a command generating unit suitable for outputting the operation command and the mode selection information.

4. The storage device of claim 2, wherein the mode selection information includes Single Level Cell (SLC) mode selection information corresponding to the first algorithm or Multi-Level Cell (MLC) mode selection information corresponding to the second algorithm.

5. The storage device of claim 2, wherein the memory interface includes:
   a mode storing unit suitable for storing previous mode information of the memory device;
   a mode comparing unit suitable for comparing the mode selection information with the previous mode information, and outputting mode maintenance information or mode change information based on a result of the comparison; and
   a command outputting unit suitable for outputting the memory operation command set including the mode maintenance information or the mode change information to the memory device.

6. The storage device of claim 5, wherein the previous mode information stored in the mode storing unit is updated whenever the memory device performs the operation corresponding to the command.

7. The storage device of claim 5, wherein, when the previous mode information is the same as the mode selection information, the mode comparing unit outputs the mode maintenance information, and when the previous mode information is different from the mode selection information, the mode comparing unit outputs the mode change information.

8. The storage device of claim 5, wherein the mode comparing unit outputs the mode maintenance information when a previous mode of the memory device is an SLC mode corresponding to the first algorithm and the mode selection information corresponds to an SLC mode selection information, or when a previous mode of the memory device is an MLC mode corresponding to the second algorithm and the mode selection information corresponds to MLC mode selection information.

9. The storage device of claim 5, wherein the mode comparing unit outputs the mode change information when a previous mode of the memory device is an SLC mode corresponding to the first algorithm and the mode selection information corresponds to MLC mode selection information, or when a previous mode of the memory device is an MLC mode corresponding to the second algorithm and the mode selection information corresponds to SLC mode selection information.

10. The storage device of claim 1, wherein the memory controller generates an address, and transmits the address with data received from the host, to the memory device.

11. The storage device of claim 1, wherein the memory device includes:
a memory cell array;
a peripheral circuit suitable for performing a program operation, a read operation, or an erase operation on the memory cell array; and
a control circuit suitable for controlling the peripheral circuit so that a selected operation is performed by maintaining a previous mode or changing a mode based on the memory operation command set.

12. The storage device of claim 11, wherein the control circuit includes:
a mode changing determining unit suitable for outputting a first mode signal or a second mode signal based on the memory operation command set; and
a mode operating unit suitable for controlling the peripheral circuit so that the selected operation is performed in a first mode corresponding to the first algorithm based on the first mode signal, or the selected operation is performed in a second mode corresponding to the second algorithm based on the second mode signal.

13. A memory system, comprising:
a host configured to output a command;
a memory controller configured to generate mode maintenance information for maintaining a previous mode or mode change information for changing the previous mode to a mode selected according to the command; and
a memory device configured to perform a first algorithm corresponding to the previous mode according to the mode maintenance information and a second algorithm corresponding to the mode according to the mode change information.

14. The memory system of claim 13, wherein
the memory device performs the selected operation in the previous mode when the mode maintenance information is received, and performs the selected operation by changing the previous mode to the mode when the mode change information is received.

15. The memory system of claim 14, wherein the memory controller includes:
a host interface suitable for generating an operation command based on the command;
a Flash Translation Layer (FTL) suitable for generating mode access data based on the operation command, and outputting the operation command and a mode selection information;
a mode selecting unit suitable for outputting the mode selection information based on the mode access data; and
a memory interface suitable for outputting the memory operation command set to the memory device based on the mode maintenance information or the mode change information.

16. The memory system of claim 15, wherein the FTL includes:
a mode transmitting unit suitable for transmitting the mode access data to the mode selecting unit in response to the operation command; and
a command generating unit suitable for outputting the operation command and the mode selection information.

17. The memory system of claim 15, wherein the mode selection information includes SLC mode selection information corresponding to the first algorithm or MLC mode selection information corresponding to the second algorithm.

18. The memory system of claim 15, wherein the memory interface includes:
a mode storing unit suitable for storing previous mode information of the memory device;
a mode comparing unit suitable for comparing the mode selection information with the previous mode information, and outputting mode maintenance information or mode change information based on a result of the comparison; and
a command outputting unit suitable for outputting the memory operation command set including the mode maintenance information or the mode change information to the memory device.

19. The memory system of claim 14, wherein the memory device includes:
a memory cell array;
a peripheral circuit suitable for performing a program operation, a read operation, or an erase operation on the memory cell array; and
a control circuit suitable for controlling the peripheral circuit so that a selected operation is performed by maintaining a previous mode or changing a mode based on the memory operation command set.

20. The memory system of claim 19, wherein the control circuit includes:
a mode changing determining unit suitable for outputting a first mode signal or a second mode signal based on the memory operation command set; and
a mode operating unit suitable for controlling the peripheral circuit so that the selected operation is performed in a first mode based on the first mode signal, or the selected operation is performed in a second mode based on the second mode signal.

21. A method for operating a storage device including a memory controller and a memory device, the method comprising:
generating, by the memory controller, an operation command set including mode maintenance information or mode change information determined according to a command received from a host; and
receiving, by the memory device, the operation command set to perform an operation corresponding to the operation command set by a first algorithm according to the mode maintenance information or by a second algorithm according to the mode change information.

* * * * *